United States Patent

Frost

Patent Number: 5,816,621
Date of Patent: Oct. 6, 1998

[54] QUICK RELEASE MECHANISM FOR HYDRAULIC AND GAS CARRYING LINES

[76] Inventor: Terry J. Frost, RR#1, Site 9, C5, Golden, British Columbia, Canada, V0A 1H0

[21] Appl. No.: 888,268

[22] Filed: Jul. 3, 1997

[51] Int. Cl.$^6$ .................................................. F16L 35/00
[52] U.S. Cl. .............................. 285/1; 285/316; 285/81; 137/595
[58] Field of Search .................................. 285/305, 124.1, 285/308, 310, 313, 316, 23, 1, 81, 85, 86, 18, 29, 91, 312, 26; 137/594, 595, 614.04

[56] References Cited

U.S. PATENT DOCUMENTS

| | | | |
|---|---|---|---|
| 3,730,221 | 5/1973 | Vik | 137/614 |
| 4,596,263 | 6/1986 | Snider | 137/68.1 |
| 4,682,795 | 7/1987 | Rabushka et al. | 285/1 |
| 4,754,780 | 7/1988 | Smith, III | 137/614.04 |
| 4,881,573 | 11/1989 | Durant et al. | 137/614.04 |
| 5,285,807 | 2/1994 | Nitzberg | 137/68.1 |
| 5,379,798 | 1/1995 | Syljeset et al. | 137/614.04 |
| 5,507,530 | 4/1996 | Mahaney | 285/26 |

Primary Examiner—Eric K. Nicholson
Assistant Examiner—Gary Grafel
Attorney, Agent, or Firm—David L. Volk

[57] ABSTRACT

A pair of quick disconnect female fittings each have a first end adapted to be connected to a first pipe, and a second end adapted to engage a quick disconnect male fitting attached to a second pipe. Each of the quick disconnect female fittings includes a sleeve adapted to cause the quick disconnect male fitting to disconnect from the quick disconnect female fitting when the sleeve is urged toward the first end. A pair of elongated members are disposed generally parallel to the quick disconnect female fittings. A plate is configured to slide along the elongated members. The plate is configured such that when urged toward the first ends of the quick disconnect female fittings along the elongated members, the plate will urge the sleeves toward the first ends. A first spring is disposed on each of the elongated members and is configured to urge the plate toward the first ends of the quick disconnect female fittings. Each of the elongated members includes a recess therein. A pair of restraining pins are slidably attached to the plate. A second spring is provided on each of the restraining pins, and is configured to urge the restraining pin out of the recess. A release pin is configured to be removably insertable through an aperture in the plate. The aperture is positioned such that when the release pin is inserted through the aperture, the release pin limits the travel of the restraining pin and the restraining pin is maintained in the recess.

5 Claims, 4 Drawing Sheets

QUICK RELEASE MECHANISM FOR HYDRAULIC AND GAS CARRYING LINES

BACKGROUND OF THE INVENTION

1. Field of the Invention

The present invention relates to apparatus for disconnecting piping systems.

2. Description of the Related Art

When logging by helicopter, a hydraulic grappling device is slung underneath of the helicopter. Hydraulic lines and a load line run from the helicopter to the grappling device. The load line is designed to carry the weight of the grappling device and the load of timber within the grappling device.

At times, if the helicopter runs into engine trouble, or the grappling device, load line or hydraulic lines become snagged, the helicopter pilot must release the load line, and thus the grappling device and the timber, from the helicopter. Usually, the hydraulic lines then snap off of the helicopter, potentially damaging the helicopter, the hydraulic lines and the connection fittings to the helicopter, and resulting in a loss of hydraulic oil. If the hydraulic lines do not snap off, they can drag the helicopter down, causing it to crash.

A device which automatically disconnects the hydraulic lines when the load line is dropped, would solve the above-mentioned problems.

Other applications for such a device would include farm tractors which tow hydraulically powered farm equipment behind them. If a hitch pin drops, thus disconnecting the implement from the tractor except for the hydraulic lines, the hydraulic lines tear off and oil spills all over the ground.

SUMMARY OF THE INVENTION

The quick release mechanism of the present invention includes a pair of quick disconnect female fittings, each of which have a first end adapted to be connected to a first pipe, and a second end adapted to engage a quick disconnect male fitting attached to a second pipe. Each of the quick disconnect female fittings includes a sleeve adapted to cause the quick disconnect male fitting to disconnect from the quick disconnect female fitting when the sleeve is urged toward the first end. A pair of elongated members are disposed generally parallel to the quick disconnect female fittings. A plate is configured to slide along the elongated members. The plate is configured such that when urged toward the first ends of the quick disconnect female fittings along the elongated members, the plate will urge the sleeves toward the first ends. A first spring is disposed on each of the elongated members and is configured to urge the plate toward the first ends of the quick disconnect female fittings. Each of the elongated members includes a recess therein. A pair of restraining pins are slidably attached to the plate. A second spring is provided on each of the restraining pins, and is configured to urge the restraining pin out of the recess. A release pin is configured to be removably insertable through an aperture in the plate. The aperture is positioned such that when the release pin is inserted through the aperture, the release pin limits the travel of the restraining pins and the restraining pins are maintained in the recess. When the release pin is removed from the aperture, the restraining pins are urged by the second springs out of the recesses, and the first springs urge the plate against the sleeves, thus causing the quick disconnect male fittings and the second pipes to disconnect from the quick disconnect female fittings and the first pipes.

When the present invention is used with a logging helicopter, the second pipes attached to the quick disconnect male fittings are hydraulic lines connected to the grappling device. A tether is tied between the release pin and the load line. The load line extends between the helicopter and the grappling device. When the pilot drops the grappling device by releasing the load line, the tether pulls the release pin out of the aperture, causing the hydraulic lines connected to the grappling device to separate from the quick disconnect female fittings, as described above.

DETAILED DESCRIPTION

Figure 1:
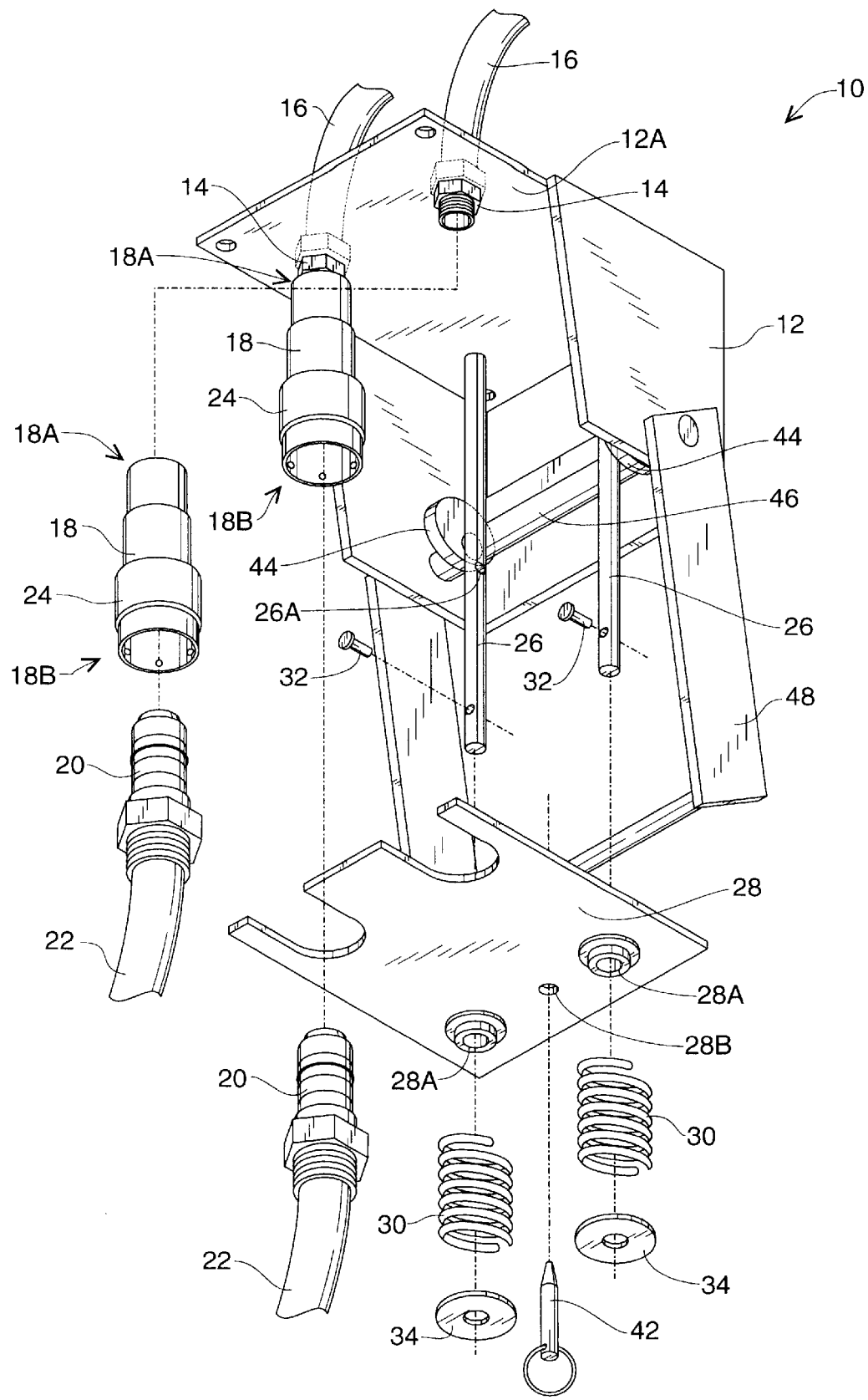
FIG 1 is an exploded perspective view of the quick release mechanism of the present invention.
Figure 2:
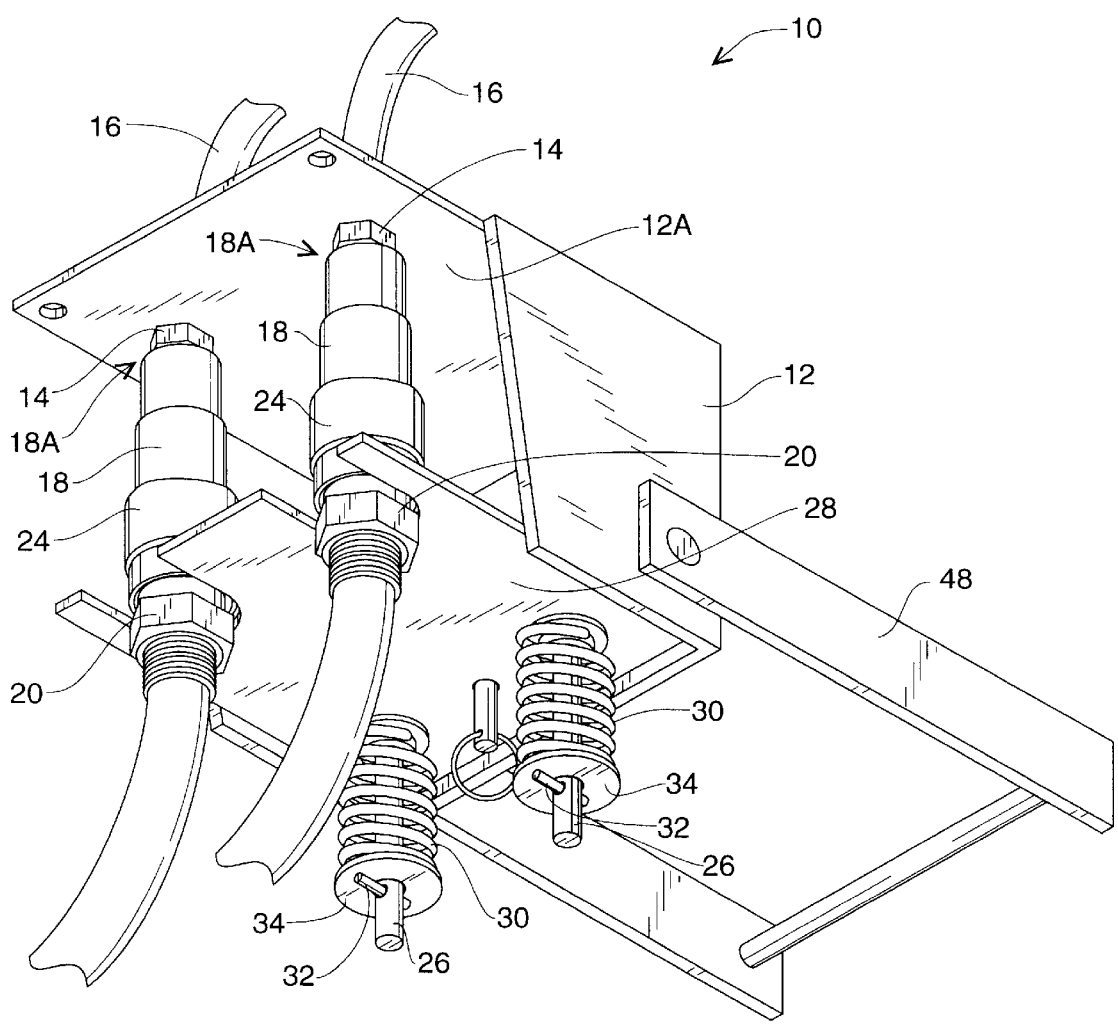
FIG. 2 is a perspective view of the quick release mechanism, shown assembled.

FIG. 1 is an exploded perspective view of a quick release mechanism 10 of the present invention. FIG. 2 is a perspective view of the quick release mechanism 10, shown assembled. Referring to FIGS. 1 and 2, the mechanism 10 comprises a housing 12, having two connectors 14 positioned in a first wall 12A of the housing 12. The connectors 14 are adapted for connection to a pair of first pipes 16, and are configured for connection to first ends 18A of a pair of quick disconnect female fittings 18.

Second ends 18B of the quick disconnect female fittings 18 are adapted for attachment to a pair of quick disconnect male fittings 20, which are connected to second pipes 22. Each of the quick disconnect female fittings 18 includes a sleeve 24 adapted to cause the quick disconnect male fitting 20 to disconnect from the quick disconnect female fitting 18 when the sleeve 24 is urged toward the first end 18A.

A pair of elongated members 26 are connected to the first wall 12A, and are disposed generally parallel to the quick disconnect female fittings 18. A plate 28 is configured to slide along the elongated members 26, the elongated members 26 extending through two holes 28A in the plate 28. The plate 28 is configured such that when urged toward the first end 18A of the quick disconnect female fittings 18 along the elongated members 26, the plate 28 will urge the sleeves 24 toward the first ends 18A. A first spring 30 is disposed on each of the elongated members 26 and is configured to urge the plate 28 toward the first ends 18A of the quick disconnect female fittings 18. As shown, the first springs 30 are maintained on the elongated members 26 with pins 32 and washers 34.

Figure 3:
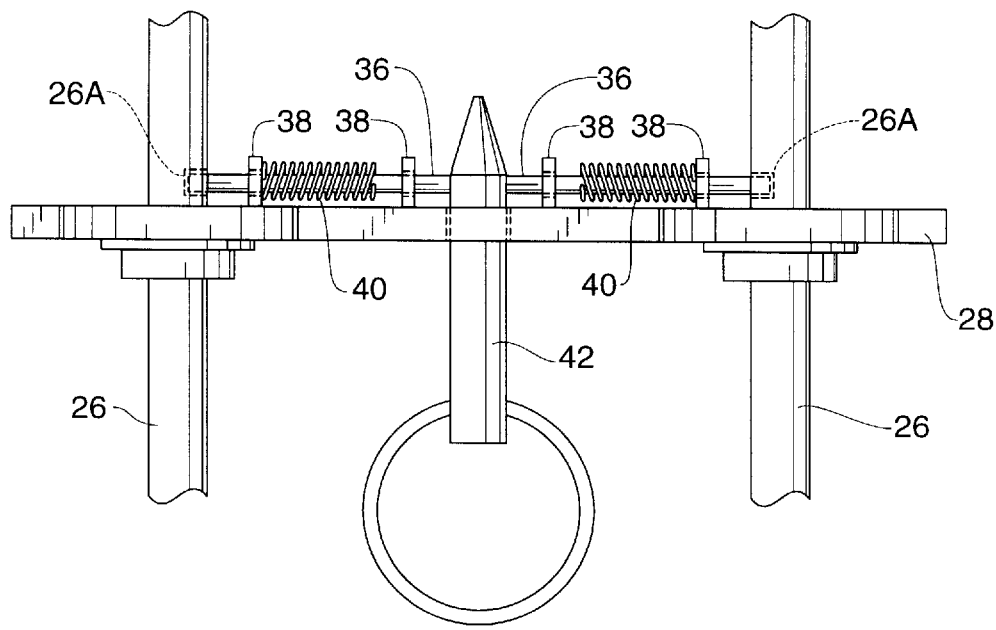
FIGS. 3 and 4 are partial elevational views of the quick release mechanism, showing the operation of the release pin and the restraining pins.
Figure 4:
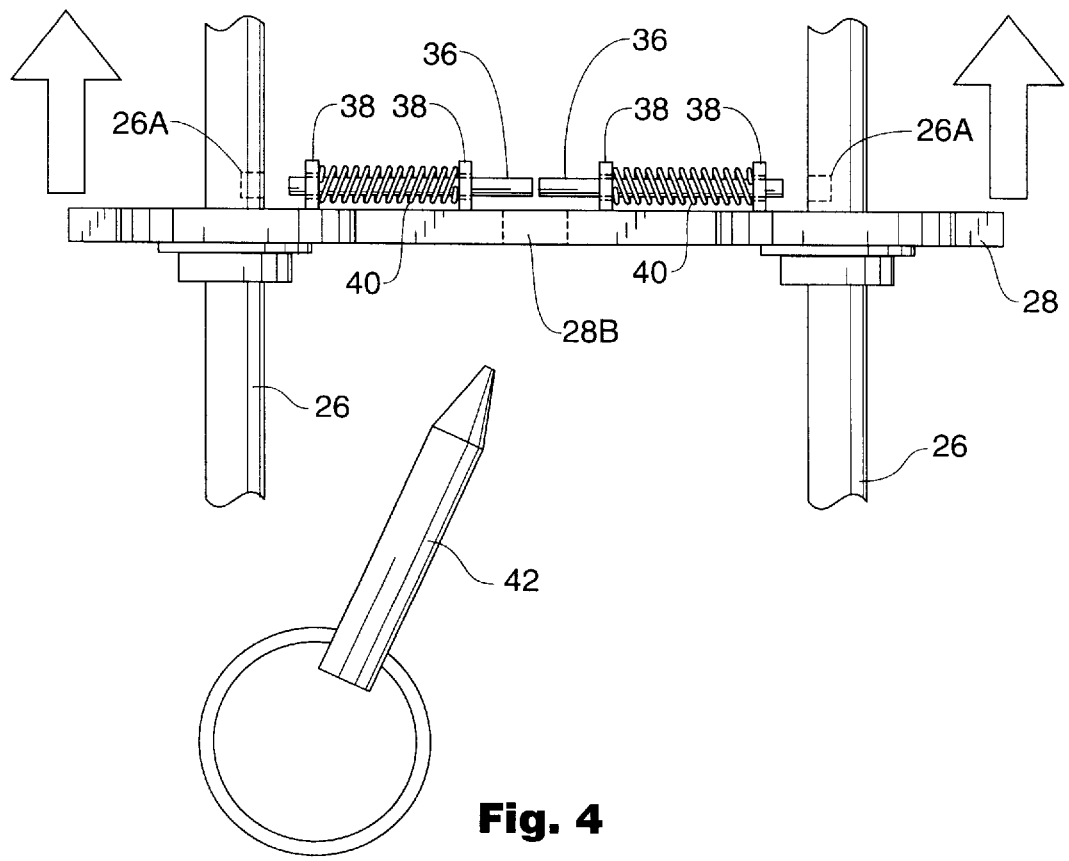

FIGS. 3 and 4 are partial elevational views of the quick release mechanism 10. Referring to FIGS. 1, 3 and 4, each of the elongated members 26 includes a recess 26A therein. Referring now primarily to FIGS. 3 and 4, a pair of restraining pins 36 are slidably attached by collars 38 to the plate 28. A second spring 40 is provided on each of the restraining pins 36, and is configured to urge the restraining pin 36 out of the recess 26A.

A release pin 42 is removably insertable through an aperture 28B in the plate 28. The aperture 28B is positioned such that when the release pin 42 is inserted through the aperture 28B, the release pin 42 limits the travel of the restraining pins 36 and the restraining pins 26 are maintained in the recesses 26A.

When the release pin 42 is removed from the aperture 28B, the restraining pins 36 are urged by the second springs 40 out of the recesses 26A, and the first springs 30 urge the plate 28 against the sleeves 24, thus causing the quick disconnect male fittings 20 and the second pipes 22 to disconnect from the quick disconnect female fittings 18 and the first pipes 16.

Referring to FIGS. 1 and 2, a pair of cams 44 are mounted to an axle 46. The axle 46 is connected to a reset handle 48 configured to rotate the axle 46 such that the cams 44 move from a first position wherein the plate 28 is permitted to slide toward the first end 18A, to a second position wherein the plate 28 is urged against the first springs 30 to permit insertion of the restraining pins 36 into the recesses 26A. The first position is indicated in FIG. 1, and the second position is shown in FIG. 2.

Figure 5:
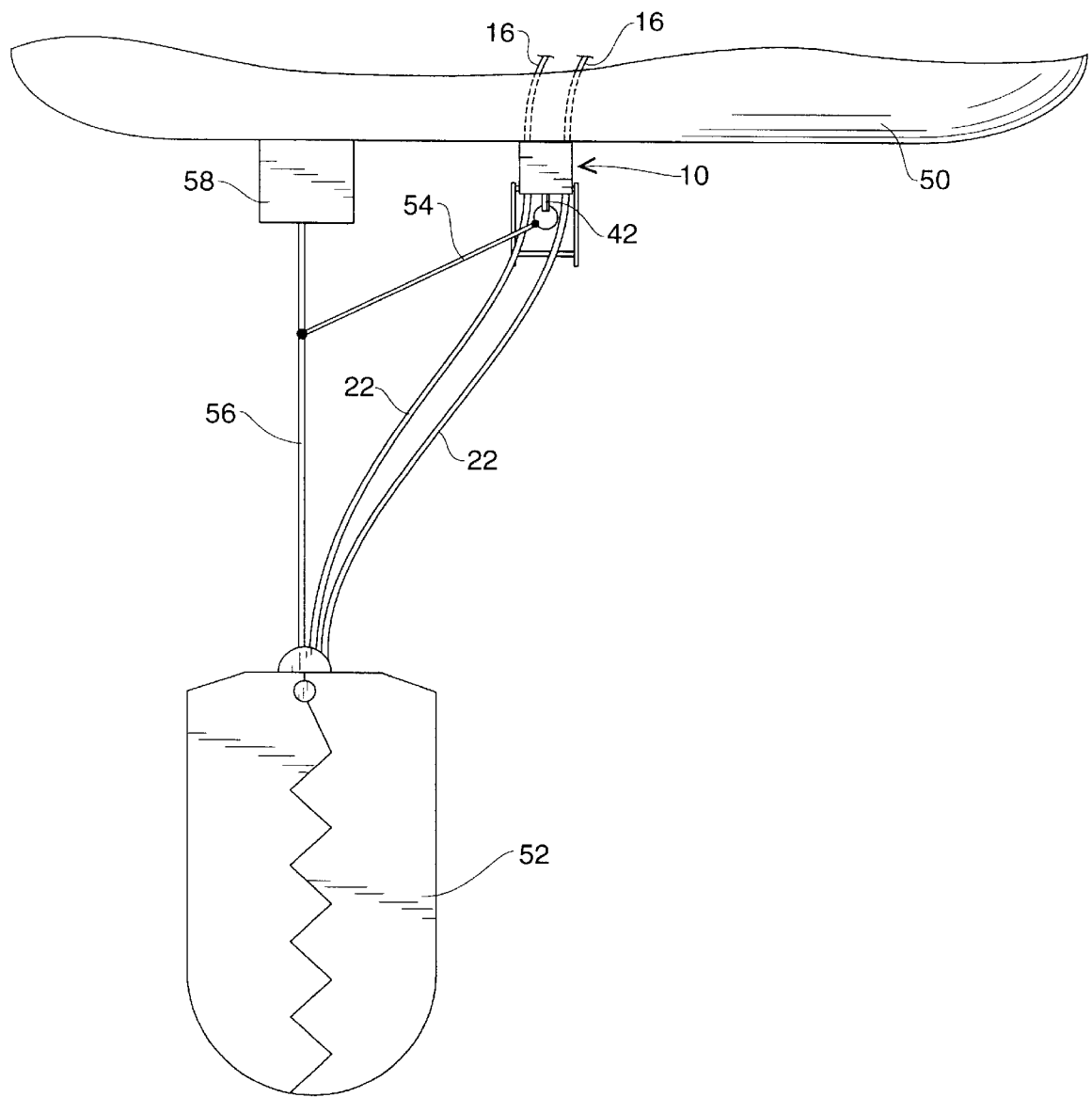
FIG. 5 is an elevational view of the quick release mechanism in use on a logging helicopter.

FIG. 5 is an elevational view of the quick release mechanism 10 in use on a logging helicopter 50. The second pipes 22 attached to the quick disconnect male fittings 20 are hydraulic lines connected to a grappling device 52. A tether 54 is tied between the release pin 42 and a load line 56. The load line 56 extends between an automatic load line release mechanism 58 on the helicopter 50 and the grappling device 52. The grappling device 52, the load line 56, and the load line release mechanism 58 are conventional accessories to the logging helicopter 50.

When the pilot drops the grappling device 52 by releasing the load line 56, the tether 54 pulls the release pin 42 out of the aperture 28B, causing the hydraulic lines connected to the grappling device 52 to separate from the quick disconnect female fittings 18, as described above. The length of the tether 54 and the point where it is tied to the load line 56 are such that the release pin 42 is pulled out of the aperture 28B before the hydraulic lines become taut. Thus, the hydraulic lines are released from the helicopter 50 without snapping or breaking, or pulling against the helicopter 50.

Similar arrangements are possible for any type of equipment towed behind any type of vehicle. Additionally, the release pin 42 can be configured to be remotely removed from the aperture 28B by means of a solenoid or other known means.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. Accordingly, the scope of the invention is to be limited only by the following claims and their legal equivalents.

The invention claimed is:

1. A quick release mechanism comprising:
   a. at least one quick disconnect female fitting having a first end adapted to be connected to a first pipe;
   b. the quick disconnect female fitting having a second end adapted to engage a quick disconnect male fitting attached to a second pipe;
   c. the quick disconnect female fitting having a sleeve adapted to cause the quick disconnect male fitting to disconnect from the quick disconnect female fitting when the sleeve is urged toward the first end;
   d. a sleeve urging means;
   e. a restraining means for restraining the sleeve urging means;
   f. the sleeve urging means configured to urge the sleeve toward the first end when the restraining means is disengaged, thereby disconnecting the quick disconnect male fitting and the second pipe from the quick disconnect female fitting and the first pipe;
   g. at least one elongated member disposed generally parallel to the quick disconnect female fitting;
   h. a plate configured to slide along the elongated member, the plate extending between the elongated member and the quick disconnect female fitting, the plate configured such that when urged toward the first end of the quick disconnect female fitting along the elongated member, the plate will urge the sleeve toward the first end; and
   i. a first spring disposed on the elongated member and configured to urge the plate toward the first end.

2. The mechanism of claim 1, wherein the restraining means comprises:
   a. a recess in the at least one elongated member;
   b. a restraining pin slidably attached to the plate;
   c. a second spring configured to urge the restraining pin out of the recess;
   d. a release pin configured to be removably insertable through an aperture in the plate;
   e. the aperture positioned such that when the release pin is inserted through the aperture, the release pin limits the travel of the restraining pin and the restraining pin is maintained in the recess; and
   f. wherein when the release pin is removed from the aperture, the restraining pin is urged by the second spring out of the recess, and the first spring urges the plate toward the first end of the quick disconnect female fitting along the elongated member, the plate urging the sleeve toward the first end.

3. The mechanism of claim 2, further comprising a reset means configured to urge the plate against the first spring to permit insertion of the restraining pin into the recess.

4. The mechanism of claim 3, wherein the reset means comprises at least one cam mounted to an axle, the axle connected to a handle configured to rotate the axle such that the cam moves from a first position wherein the plate is permitted to slide toward the first end, to a second position wherein the plate is urged against the first spring to permit insertion of the restraining pin into the recess.

5. A quick release mechanism comprising:
   a. at least one quick disconnect female fitting having a first end adapted to be connected to a first pipe;
   b. the quick disconnect female fitting having a second end adapted to engage a quick disconnect male fitting attached to a second pipe;
   c. the quick disconnect female fitting having a sleeve adapted to cause the quick disconnect male fitting to disconnect from the quick disconnect female fitting when the sleeve is urged toward the first end;
   d. at least one elongated member disposed generally parallel to the quick disconnect female fitting;
   e. a plate configured to slide along the elongated member, the plate extending between the elongated member and the quick disconnect female fitting, the plate configured such that when urged toward the first end of the quick disconnect female fitting along the elongated member, the plate will urge the sleeve toward the first end;
   f. a first spring disposed on the elongated member and configured to urge the plate toward the first end;
   g. a recess in the at least one elongated member;
   h. a restraining pin slidably attached to the plate;
   i. a second spring configured to urge the restraining pin out of the recess;

j. a release pin configured to be removably insertable through an aperture in the plate;
k. the aperture positioned such that when the release pin is inserted through the aperture, the release pin limits the travel of the restraining pin and the restraining pin is maintained in the recess;
l. wherein when the release pin is removed from the aperture, the restraining pin is urged by the second spring out of the recess, and the first spring urges the plate toward the first end of the quick disconnect female fitting along the elongated member, the plate urging the sleeve toward the first end; and
m. at least one cam mounted to an axle, the axle connected to a handle configured to rotate the axle such that the cam moves from a first position wherein the plate is permitted to slide toward the first end, to a second position wherein the plate is urged into a position which aligns the restraining pin with the recess.

* * * * *